United States Patent [19]

Speranza et al.

[11] Patent Number: 5,120,817
[45] Date of Patent: Jun. 9, 1992

[54] EPOXY RESIN COMPOSITIONS

[75] Inventors: George P. Speranza; Harold G. Waddill, both of Austin; Jiang-Jen Lin, Houston, all of Tex.

[73] Assignee: Texaco Chemical Company, White Plains, N.Y.

[21] Appl. No.: 661,142

[22] Filed: Feb. 27, 1991

[51] Int. Cl.$^5$ .............................................. C08G 59/00
[52] U.S. Cl. ...................... 528/99; 528/129; 528/160; 528/162
[58] Field of Search ................. 528/99, 129, 162, 160; 260/570.5

[56] References Cited

U.S. PATENT DOCUMENTS 3,236,895  2/1966  Lee et al. ........................... 564/505
3,734,965  5/1973  Becker ........................... 260/570.5 P
4,006,089  2/1977  Chibnik ........................... 252/51.5 R Primary Examiner—John Kight, III
Assistant Examiner—Richard Lee Jones
Attorney, Agent, or Firm—Jack H. Park; Kenneth R. Priem; Richard A. Morgan

[57] ABSTRACT

An epoxy resin composition comprises an vicinal polyepoxide and a Mannich condensation reaction product curing agent. The curing agent is the Mannich condensation reaction product of a phenol, formaldehyde and a polyoxyethylenediamine of the formula:

$$NH_2(CH_2CH_2O)_x\text{---}CH_2CH_2NH_2,$$

and wherein: x ranges from 1 to 3. These epoxy resin compositions are useful in coatings, adhesives, encapsulations and composite matrices.

16 Claims, No Drawings

EPOXY RESIN COMPOSITIONS

BACKGROUND OF THE INVENTION

1. Field of The Invention

The invention relates to an epoxy resin composition. More particularly, the invention relates to epoxy curing agent. Most particularly the invention relates to epoxy curing agents comprising the Mannich condensation product of a phenol, formaldehyde and a polyoxyethylenediamine.

2. Description Of The Related Art

Epoxy resins constitute a broad class of polymeric materials having a wide range of physical properties. The resins are characterized by epoxide groups which are cured by reaction with certain catalysts or curing agents to provide cured epoxy resin compositions with certain desirable properties.

The most common epoxy resins are a condensation product of epichlorohydrin and bisphenol A. Epoxy resins are cured with any of the conventional curing agents such as polyamines, polycarboxylic acids, anhydrides and Lewis acids.

Mannich condensation is a well-known reaction wherein a phenolic compound is reacted with formaldehyde and a primary or secondary amine to provide a substituted aminomethyl derivative of the phenolic starting material.

U.S. Pat. No. 3,236,895 to J. M. Lee and J. C. Winfrey teaches the preparation of polyoxyalkylenepolyamines. These amines are used for curing epoxy resin compositions.

U.S. Pat. No. 3,734,965 to W. Becker et al. teaches phenolic resins having a polyoxypropyleneamine substituent. These compounds are used as curing agents for epoxy resins.

U.S. Pat. No. 3,847,726 to W. Becker et al., teaches vibration-damping sheet laminates. The laminates comprise epoxy resins which are cured with a polyether amine which is a Mannich condensation product of a phenol, an aldehyde and a polyoxypropylene amine.

U.S. Pat. No. 4,006,089 to S. Chibnik teaches polyoxyethylene polyamine Mannich base products used in fuels and lubricants.

SUMMARY OF THE INVENTION

The invention is an epoxy resin composition comprising a vicinal polyepoxide having an average of at least 1.8 reactive 1,2-epoxy groups per molecule and a curing amount of a Mannich condensate curing agent. The Mannich condensate product is the reaction product of a phenol, formaldehyde and a selected polyoxyethylenediamine. These diamines are of the formulae:

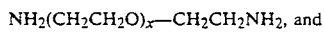

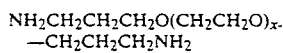

wherein: x ranges from 1 to 3.

These epoxy resin compositions cure rapidly at ambient temperature. The cured compositions are useful for coatings, adhesives, encapsulations and in composite matrices.

DESCRIPTION OF THE PREFERRED EMBODIMENTS

The procedure for making the Mannich condensates comprising the curing agent begins by premixing one mole of the phenol with one, two or three moles of the polyoxyethylenediamine. The formaldehyde is then slowly added at a temperature below the temperature of Novolak formation. At the end of the formaldehyde addition, the reaction mixture is slowly heated with agitation to a temperature of at least 50° C., typically in the range of about 80° C. to 150° C., for a period of time sufficient to reduce the formaldehyde content to about 1 wt % or less. This end point is noted in laboratory preparation by the absence of formaldehyde aroma. The reaction will normally require about 2 to about 4 hours time at the elevated temperature.

At the end of the reaction, water is vacuum stripped from the reaction mixture. The resulting crude Mannich reaction product is purified from unreacted and partially reacted materials by vacuum stripping. The resulting clear liquid is ready for use as an epoxy resin curative without further purification.

The phenolic compound employed in the Mannich condensation is an aromatic compound containing one or more hydroxyl groups attached directly to the aromatic nucleus and having a hydrogen atom on one or more of the ring positions ortho and para to the hydroxyl group and which is otherwise unsubstituted or substituted with substituent groups which are non-reactive under Mannich reaction conditions. Substituent groups that may be present include alkyl, cycloalkyl, aryl, halo, nitro, carboalkoxy, haloalkyl and hydroxyalkyl. The phenolic compound is further characterized by a molecular weight within the range of from about 94 to about 500.

Examples of acceptable phenolic compounds include phenol itself (C$_6$H$_5$OH), o-, m-, or p-cresols, ethylphenol, nonylphenol, p-phenylphenol, 2,2-bis(4-hydroxyphenyl)propane, β-naphthol, β-hydroxyanthracene, p-chlorophenol, o-bromophenol, 2,6-dichlorophenol, p-nitrophenol, 4-nitro-6-phenylphenol, 2-nitro-4-methylphenol, 3,5-dimethylphenol, p-isopropylphenol, 2-bromo-4-cyclohexylphenol, 2-methyl-4-bromophenol, 2-(2-hydroxypropyl)phenol, 2-(4-hydroxyphenol)ethanol, 2-carboethoxyphenol and 4-choromethylphenol. Especially preferred are phenol per se and nonylphenol.

Formaldehyde may be employed in the Mannich reaction in any of its conventional forms, such as an aqueous formalin solution, an inhibited methanol solution, paraformaldehyde or trioxane.

The mole ratio of phenol:formaldehyde:polyoxyethylenediamine may be from 1:1:1 to 1:3:3. Preferably the mole ratio is 1:1:1 to 1:2:2. In another embodiment, the mole ratio is 1:1:1 to 1.5:1.5:1. Example 2, formulation 6297-40D gelled at a ratio of 2:2:1.

In the formulation of the epoxy resin composition the curing agent and optionally an accelerator are mixed immediately prior to use to form a compatible solution. The epoxy resin is added and the mixture is stirred until homogeneous. The mixture is ready for use in coatings, adhesives, encapsulations and composite matrixes.

The curative agent is usually added to the formulation in such an amount that there is one reactive NH group in the curing component for each epoxy group in the epoxy resin component. These are known as stoichiometric quantities. The stoichiometric quantity can be calculated from the knowledge of the chemical structure and analytical data on the component.

For the purposes of the present invention, the stoichiometric amount of curative agent is calculated by adding together the number of equivalents on the basis of wt % replaceable NH groups. In general, it is advantageous to use up the 10% excess of the curative agent over the stoichiometric amount.

Stoichiometry unfortunately is not always calculable. The proper amount of curative to provide best properties is usually determined by the preparation of a number of samples which are tested to determine the composition with the most desirable physical characteristics.

With many curatives, curing may be accomplished at ambient conditions. For development of optimum achievable properties, however, curing at elevated temperature may be necessary. The curing temperature range acceptable in this invention is from about 120° C. to about 180° C. for about 1 to 3 hours. Preferably curing is done at about 150° C. for 1 to 2 hours.

The preferred epoxy base resin is a vicinal polyepoxide containing compound. Generally the vicinal polyepoxide containing compounds which are amine cured are organic materials having an average of at least 1.8 reactive 1,2-epoxy groups per molecule. These polyepoxide materials can be monomeric or polymeric, saturated or unsaturated, aliphatic, cycloaliphatic, aromatic or heterocyclic, and may be substituted if desired with other substituents besides the epoxy groups, e.g., hydroxyl groups, ether radicals, aromatic halogen atoms and the like. These vicinal polyepoxide containing compounds typically are of an epoxy equivalent weight of 150 to 250. Preferably the base resin, which has an epoxide equivalent weight of from 175 to 195, is derived from condensing epichlorohydrin with 2,2-bis(p-hydroxyphenyl propane) to form 2,2-bis[(p-2,3 epoxy propoxy)phenyl] propane, a derivative of bisphenol A.

Preferred polyepoxides are those of glycidyl ethers prepared by epoxidizing the corresponding allyl ethers or reacting, by known procedures, a molar excess of epichlorohydrin and an aromatic polyhydroxy compound, i.e., isopropylidene bisphenol, novolac, resorcinol, derivatives or aromatic amines, etc. The epoxy derivatives of methylene or isopropylidene bisphenols are especially preferred.

A widely used class of polyepoxides which are useful according to the present invention includes the resinous epoxy polyethers obtained by reacting an epihalohydrin, such as epichlorohydrin, and the like, with either a polyhydric phenol or a polyhydric alcohol. Typically the epoxy resins have an average of at least 1.8 reactive, 1,2-epoxy groups per molecule. An illustrative, but by no means exhaustive, listing of suitable dihydric phenols includes 4,4'-isopropylidene bisphenol, 2,4'-dihydroxydiphenylethylmethane, 3,3'-dihydroxydiphenyldiethylmethane, 3,4'-dihydroxydiphenylmethylpropylmethane, 2,3'-dihydroxydiphenylethylphenylmethane, 4,4'-dihydroxydiphenylpropylphenylmethane, 4,4'-dihydroxydiphenylbutylphenylmethane, 2,2'-dihydroxydiphenylditolylmethane, 4,4'-dihydroxydiphenyltolylmethylmethane and the like. Other polyhydric phenols which may also be co-reacted with an epihalohydrin to provide these epoxy polyethers are such compounds as resorcinol, hydroquinone, substituted hydroquinones, e.g., methylhydroquinone, and the like.

Among the polyhydric alcohols which can be co-reacted with an epihalohydrin to provide these resinous epoxy polyethers are such compounds as ethylene glycol, propylene glycols, butylene glycols, pentane diols, bis-(4-hydroxycyclohexyl)dimethylmethane, 1,4-dimethylolbenzene, glycerol, 1,2,6-hexanetriol, trimethylolpropane, mannitol, sorbitol, erythritol, pentaerythritol, their dimers, trimers and higher polymers, e.g., polyethylene glycols, polypropylene glycols, triglycerol, dipentaerythritol and the like, polyallyl alcohol, polyhydric thioethers, such as 2,2'-, 3,3'-tetrahydroxydipropylsulfide and the like, mercapto alcohols such as monothioglycerol, dithioglycerol and the like, polyhydric alcohol partial esters, such as monostearin, pentaerythritol monoacetate and the like, and halogenated polyhydric alcohols such as the monochlorohydrins of glycerol, sorbitol, pentaerythritol and the like.

Another class of polymeric polyepoxides which can be amine cured and are in accordance with the present invention includes the epoxy novolac resins obtained by reacting, preferably in the presence of a basic catalyst, e.g., sodium or potassium hydroxide, an epihalohydrin, such as epichlorohydrin, with the resinous condensate of an aldehyde, e.g., formaldehyde, and either a monohydric phenol, e.g., phenol itself, or a polyhydric phenol. Further details concerning the nature and preparation of these epoxy novolac resins can be obtained in Lee, H. and Neville, K., Handbook of Epoxy Resins, McGraw Hill Book Co., New York, 1967.

Optionally, the epoxy resin formulations of the present invention can include an accelerator to speed the amine cure of the epoxy resin. In several applications, an accelerator is beneficial, especially when an epoxy resin is used as an adhesive in flammable environment, thus making prolonged elevated temperature cure inconvenient or even hazardous. Lee, H. and Neville, K., Handbook of Epoxy Resins, pp. 7–14 describes the use of certain amine-containing compounds as epoxy curative agent-accelerators.

Many accelerators are known in the art which can be utilized in accordance with the instant invention. Examples include salts of phenols, salicylic acids, amine salts of fatty acids such as those disclosed in U.S. Pat. No. 2,681,901; and, tertiary amines such as those disclosed in U.S. Pat. No. 2,839,480. A preferred accelerator in accordance with the instant invention is disclosed in U.S. Pat. No. 3,875,072, G. Waddill. That accelerator comprises a combination of piperazine and an alkanol amine in a weight ratio of about 1:8 to 1:1. The above amount of accelerator is admixed with a polyoxyalkylene diamine curative agent in the amount of from about 10 to 50 parts by weight accelerator to 100 parts by weight of the curing agent.

The following Examples are illustrative of the nature of the instant invention but are not intended to be limitative thereof.

EXAMPLE 1

| Properties of Epoxy Resin Systems Cured with Phenol-Formaldehyde-Bis(aminoethyl)ether[2] (BAEE) Condensates | | |
|---|---|---|
| | 6297-36C | 6297-36D |
| Formulation Notebook | | |
| Liquid epoxy resin[1], pbw* | 100 | 100 |
| Phenol/CH$_2$O/BAEE condensate, pbw* | | |
| Mole ratio: 1/1/1 | 38 | — |
| 1/2/2 | — | 30 |
| Brookfield Viscosity, cps. ~25° C. | ~8500 | ~20000 |
| Gel time, min. (200 g mass) | 13.2 | 26.6 |
| Peak exothermic temperature, °C. | 227.5 | 238.0 |
| Time to peak temp., min. | 22.0 | 37.2 |
| Properties of Cured ⅛-in Castings:[3] | | |
| Rheometric impact, total energy, in-lb | 26 | 18 |
| Tensile strength, psi | 10100 | 9900 |

-continued

Properties of Epoxy Resin Systems Cured with Phenol-Formaldehyde-Bis(aminoethyl)ether[2] (BAEE) Condensates

|  | 6297-36C | 6297-36D |
|---|---|---|
| Tensile modulus, psi | 459000 | 399000 |
| Elongation at break, % | 9.0 | 6.1 |
| Flexural strength, psi | 15900 | 17200 |
| Flexural modulus, psi | 452000 | 409000 |
| HDT, °C., 264 psi/66 psi | 75/79 | 107/113 |
| Shore D hardness, 0–10 sec. | 81–79 | 83–81 |
| Compression strength at yield, psi | 12900 | 13400 |
| at failure, psi | 41200 | 40100 |
| % Compression at peak | 60.0 | 53.6 |
| % Weight gain, 24 hr water boil | 2.4 | 1.9 |
| 3 hour acetone boil | 3.3 | 0.8 |
| Adhesive Properties:[4] | | |
| Tensile shear strength, psi | 2800 | 2000 |
| T-peel strength, pli | 4.2 | 3.9 |

[1]Epoxy equivalent weight 185-192
[2]$H_2NCH_2CH_2OCH_2CH_2NH_2$: BAEE
[3]Cured 2 hours 80° C., then 3 hours 150° C.
[4]Cured 1 hour 150° C.
*Parts by weight

EXAMPLE 2

Properties of Epoxy Resin Systems Cured with Phenol-Formaldehyde-Triethylene Glycol Diamine[1] Condensates

|  | 6297-40D | 6297-36A | 6297-36B |
|---|---|---|---|
| Formulation Notebook | | | |
| Liquid epoxy resin[2], pbw* | 100 | 100 | 100 |
| Phenol/CH$_2$O/amine condensate, pbw* | | | |
| Mole ratio 2/2/1 | 78 | — | — |
| Mole ratio 1/1/1 | — | 45 | — |
| Mole ratio 1/2/2 | — | — | 28 |
| Brookfield viscosity, cps, ~25° C. | 5)6) | 6500 | ~7500 |
| Gel time, min. (200 g mass) | | 15.6 | 39.4 |
| Peak exothermic temp., °C. | | 210.0 | 218.5 |
| Time to peak temp., min. | | 20.5 | 55.7 |
| Properties of Cured ⅛-in castings:[3] | | | |
| Rheometric impact, total energy, in-lb. | | 40 | 22 |
| Tensile strength, psi | | 10000 | 10200 |
| Tensile modulus, psi | | 486000 | 472000 |
| Elongation at break, % | | 9.5 | 6.4 |
| Flexural strength, psi | | 17300 | 16700 |
| Flexural modulus, psi | | 469000 | 449000 |
| HDT, °C., 264 psi/66 psi | | 67/69 | 74/81 |
| Shore D hardness, 0–10 sec. | | 81–79 | 81–78 |
| Compression strength at yield, psi | | 12400 | 12500 |
| at failure, psi | | 48100 | 37600 |
| % compression at peak | | 65.0 | 60.4 |
| % weight gain, 24 hr. water boil | | 2.8 | 3.0 |
| 3 hr. acetone boil | | 3.8 | 3.8 |
| Adhesion Properties:[4] | | | |
| Tensile shear strength, psi | | 3700 | 3700 |
| T-peel strength, pli | | 4.3 | 4.0 |

[1]$H_2NCH_2CH_2OCH_2CH_2OCH_2CH_2NH_2$: JEFFAMINE® EDR-148
[2]Epoxy equivalent weight 185-192
[3]Cured 2 hours 80° C., then 3 hours 150° C.
[4]Cured 1 hour 150° C.
[5]Could not mix system without heating; no exotherm determined.
[6]Mixture exothermed, gelled while mixing; no properties were obtained.
*Parts by weight Properties of Epoxy Resin Systems Cured with Phenol-Formaldehyde-Tetraethylene Glycol Diamine[1] Condensates

|  | 6297-40A | 6297-40B | 6297-40C |
|---|---|---|---|
| Formulation Notebook | | | |
| Liquid epoxy resin[2], pbw* | 100 | 100 | 100 |
| Phenol/CH$_2$O/Amine condensate, pbw* | | | |
| Mole ratio 1/1/1 | 54 | — | — |
| Mole ratio 1/2/2 | — | 43 | — |
| Mole ratio 1/3/3 | — | — | 43 |
| Brookfield viscosity, cps, ~25° C. | ~4000 | ~4500 | ~7000 |
| Gel time, min. (200 g mass) | 19.2 | 43.3 | 59.7 |
| Peak exothermic temp., °C. | 201.8 | 210.0 | 202.5 |
| Time to peak temp., min. | 24.7 | 55.0 | 70.5 |
| Properties of cured ⅛-in castings:[3] | | | |
| Rheometric impact, total energy, in-lb. | 61 | 38 | 33 |
| Tensile strength, psi | 8650 | 8400 | 8000 |
| Tensile modulus, psi | 471000 | 392000 | 358500 |
| Elongation at break, % | 8.5 | 6.8 | 11.2 |
| Flexural strength, psi | 14500 | 14400 | 13000 |
| Flexural modulus, psi | 445500 | 382000 | 386000 |
| HDT, °C., 264 psi/66 psi | 50/52 | 65/73 | 67/72 |
| Shore D hardness, 0–10 sec. | 80–77 | 80–77 | 79–76 |
| Compression strength at yield, psi | 9600 | 10200 | 9800 |
| at failure, psi | 48600 | 36800 | 37500 |
| % compression at peak | 69.6 | 60.3 | 60.0 |
| % weight gain, 24 hr. water boil | 2.9 | 3.6 | 3.9 |
| 3 hr. acetone boil | 7.4 | 2.7 | 2.6 |
| Adhesion Properties:[4] | | | |
| Tensile shear strength, psi | 3600 | 4000 | 4100 |
| T-peel strength, pli | 4.3 | 4.2 | 4.3 |

[1]$H_2NCH_2CH_2OCH_2CH_2OCH_2CH_2OCH_2CH_2NH_2$: JEFFAMINE® EDR-102
[2]Epoxy equivalent weight 185-192
[3]Cured 2 hrs. 80° C., then 3 hrs. 150° C.
[4]Cured 1 hr. 150° C.
*Parts by weight

EXAMPLE 4

To a 2 liter 3-necked flask equipped with a stirrer, thermometer and dropping funnel was charged 188 g (2 moles) of phenol and 592 g (4 moles) triethylene glycol diamine. Then 324 g of 37% formalin (4 moles of formaldehyde) was added over a 1 hour and 23 minute period keeping the temperature at 30° C. to 45° C. The mixture was stirred for 2 hours at 28° C. and then heated to 80° C. and held at that temperature for 3 hours. The reaction mixture was next heated to 120° C. to 130° C. to remove most of the water. The remaining water was removed at 120° C. with full water aspirator vacuum. The final product was a clear yellow liquid (weight 824.8 g).

Additional preparations are summarized in Table I. When 1 mole phenol is reacted with 3 moles of formaldehyde and 3 moles of bisaminoethyl ether (x=1) or 3 moles of triethylene glycol diamine (x=2), the result was a gel. Gel products are not suitable for epoxy resin applications. When 4 moles of phenol and 4 moles of formaldehyde were reacted with 1 mole of triethylene glycol diamine the result was also a gel.

TABLE I

Comparison of Curing Activity: Condensates Prepared with Polyoxypropyleneamines vs. Similar Condensates Prepared from Polyoxyethyleneamines

| Amine In Condensate | Phenol/CH$_2$/ Amine Molar Ratio | Gel Time, Min (200 g mass) | Set-to-Dry, Hrs. | Drying Time, 6-mil film Surface Dry Hrs. | Thru-Dry Hrs. |
|---|---|---|---|---|---|
| BAEE[1] | 1/1/1 | 13.2 | 1.1 | 2.7 | — |
| JEFFAMINE® EDR-148[2] | 1/1/1 | 15.6 | 2.0 | 3.1 | — |
| JEFFAMINE® EDR-192[3] | 1/1/1 | 19.2 | 3.7 | 5.7 | 11.4 |

TABLE I-continued

Comparison of Curing Activity: Condensates Prepared
with Polyoxypropyleneamines vs. Similar Condensates
Prepared from Polyoxyethyleneamines

| Amine In Condensate | Phenol/CH₂/ Amine Molar Ratio | Gel Time, Min (200 g mass) | Set-to-Dry, Hrs. | Drying Time, 6-mil film Surface Dry Hrs. | Thru-Dry Hrs. |
|---|---|---|---|---|---|
| JEFFAMINE ® D-230[4] | 1/1/1 | 128.5 | 9.0 | 16.2 | 28.9 |
| JEFFAMINE ® D-400[5] | 1/1/1 | — | 23.8 | ~38 | ~54.4 |
| JEFFAMINE ® T-403[6] | 1/1/1 | 132[7] | 9.0 | 12.9 | ~17 |

[1] $H_2NCH_2CH_2OCH_2CH_2NH_2$
[2] $H_2NCH_2CH_2O(CH_2CH_2O)CH_2CH_2NH_2$
[3] $H_2NCH_2CH_2O(CH_2CH_2O)_2CH_2CH_2NH_2$
[4] $H_2NCH(CH_3)CH_2$—$[OCH_2CH(CH_3)]_xNH_2$ wherein x averages 2.6
[5] $H_2NCH(CH_3)CH_2$—$[OCH_2CH(CH_3)]_xNH_2$ wherein x averages 5.6
[6] 
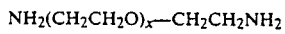

$$CH_2[OCH_2CH(CH_3)]_xNH_2$$
$$CH_3CH_2CCH_2[OCH_2CH(CH_3)]_yNH_2$$
$$CH_2[OCH_2CH(CH_3)]_zNH_2$$

wherein x + y + z averages 5.3.
[7] Time to viscosity of 20,000 cps.

| Table of Test Methods | |
|---|---|
| Gel Time (minutes) | ASTM D-2471-71 |
| Shore D-Hardness 0-10 seconds | ASTM D-2240 |
| Elongation at Break (%) | ASTM D-638 |
| Heat Deflection Temperature (HDT) (°C., 264 psi/66 psi) | ASTM D-648 |
| Tensile strength (psi) | ASTM D-638 |
| Tensile Modulus (psi) | ASTM D-638 |
| Flexural Strength (psi) | ASTM D-790 |
| Flexural Modulus (psi) | ASTM D-790 |
| Compression Strength at Yield; at Failure (psi) | ASTM D-695 |
| T-peel strength (pli) | ASTM D-1876 |
| Tensile shear strength (psi) | ASTM D-1002 |

While particular embodiments of the invention have been described, it is well understood that the invention is not limited thereto since modifications may be made. It is therefore contemplated to cover by the appended claims any such modifications as fall within the spirit and scope of the claims.

What is claimed is:

1. An epoxy resin comprising:
(a) a vicinal polyepoxide having an average of at least 1.8 reactive 1,2-epoxy groups per molecule; and
(b) a curing amount of a curing agent comprising: a Mannich condensation product of a phenol, formaldehyde and a polyoxyethylenediamine selected from the group consisting of polyoxyethylenediamines having the formula:

$$NH_2(CH_2CH_2O)_x-CH_2CH_2NH_2$$

wherein: x ranges from 1 to 3.

2. The epoxy resin of claim 1 wherein said phenol is selected from the group consisting of phenol per se and an alkylphenol wherein the alkyl in said alkylphenol comprises 6 to 12 carbon atoms.

3. The epoxy resin of claim 1 wherein said phenol is selected from the group consisting of phenol per se and nonylphenol.

4. The epoxy resin of claim 1 wherein the mole ratio of phenol:formaldehyde:polyoxyethylenediamine ranges from 1:1:1 to 1:3:3.

5. The epoxy resin of claim 1 wherein the mole ratio of phenol:formaldehyde:polyoxyethylenediamine ranges from 1:1:1 to 1:2:2.

6. The epoxy resin of claim 1 wherein the mole ratio of phenol:formaldehyde:polyoxyethylenediamine ranges from 1:1:1 to 1.5:1.5:1.

7. An epoxy resin comprising:
(a) a vicinal polyepoxide having an average of at least 1.8 reactive 1,2-epoxy groups per molecule; mixed with
(b) a curing amount of a curing agent comprising a Mannich condensation product of phenol per se or nonylphenol, formaldehyde and a polyoxyethylenediamine of the formula:

$$NH_2(CH_2CH_2O)_x-CH_2CH_2NH_2$$

wherein: x ranges from 1 to 3 and wherein the mole ratio of phenol:formaldehyde:polyoxyethylenediamine ranges from 1:1:1 to 1:2:2.

8. The epoxy resin of claim 1 wherein the mole ratio of phenol: formaldehyde: polyoxyethylenediamine is about 1:1:1.

9. An epoxy resin comprising:
(a) a vicinal polyepoxide having an average of at least 1.8 reactive 1,2-epoxy groups per molecule; and
(b) a curing amount of a curing agent comprising a Mannich condensate product of a phenol, formaldehyde and a diamine of the formula:

$$NH_2CH_2CH_2CH_2O(CH_2CH_2O)_xCH_2CH_2CH_2NH_2$$

wherein: x ranges from 1 to 3.

10. The epoxy resin of claim 9 wherein said phenol is selected from the group consisting of phenol per se and an alkylphenol wherein the alkyl in said alkylphenol comprises 6 to 12 carbon atoms.

11. The epoxy resin of claim 9 wherein said phenol is selected from the group consisting of phenol per se and nonylphenol.

12. The epoxy resin of claim 9 wherein the mole ratio of phenol:formaldehyde:polyoxyethylenediamine ranges from 1:1:1 to 1:3:3.

13. The epoxy resin of claim 9 wherein the mole ratio of phenol:formaldehyde:polyoxyethylenediamine ranges from 1:1:1 to 1:2:2.

14. The epoxy resin of claim 9 wherein the mole ratio of phenol:formaldehyde:polyoxyethylenediamine ranges from 1:1:1 to 1.5:1.5:1.

15. An epoxy resin comprising:
(a) a vicinal polyepoxide having an average of at least 1.8 reactive 1,2-epoxy groups per molecule; mixed with
(b) a curing amount of a curing agent comprising a Mannich condensation product of phenol per se or nonylphenol, formaldehyde and a polyoxyethylenediamine of the formula:

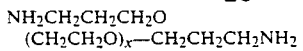

wherein: x ranges from 1 to 3, and wherein the mole ratio of phenol: formaldehyde: polyoxyethylenediamine ranges from 1:1:1 to 1:2:2.

16. The epoxy resin of claim 15 wherein the mole ratio of phenol: formaldehyde: polyoxyethylenediamine is about 1:1:1.

* * * * *